Nov. 8, 1955     J. H. JACOBS     2,723,388
PRESSURE RESPONSIVE WARNING SIGNAL
Filed Sept. 3, 1953
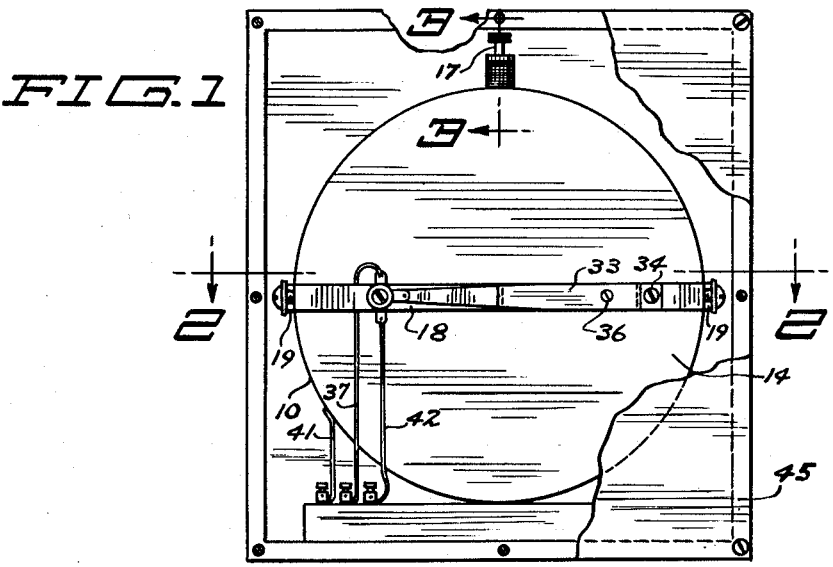
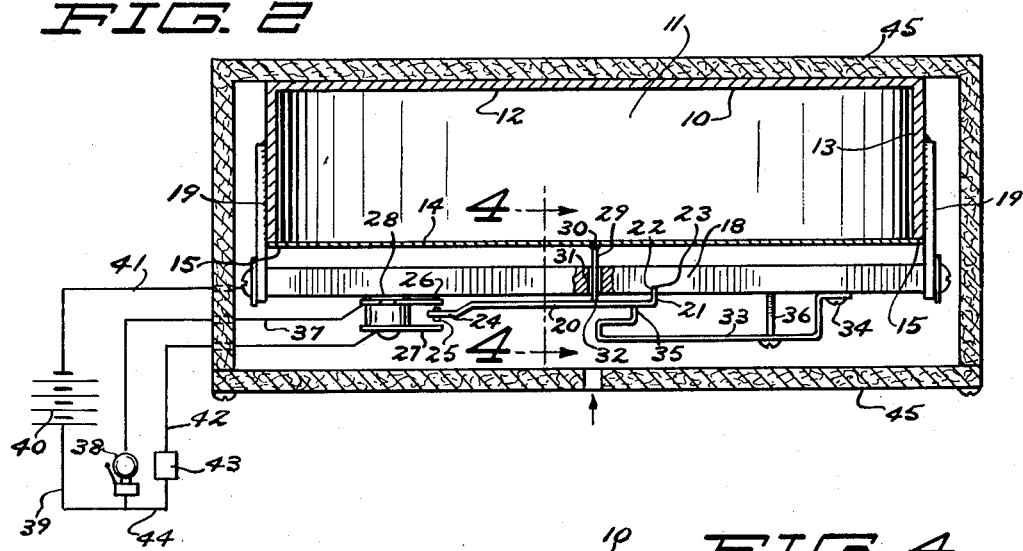
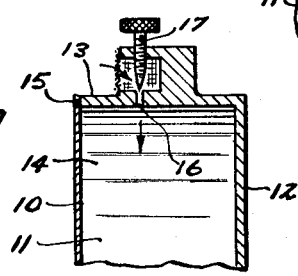
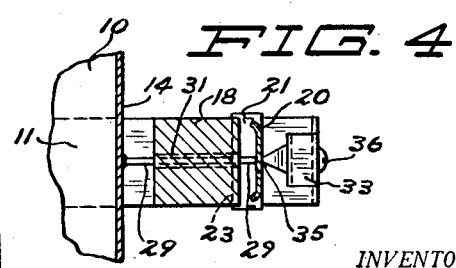
INVENTOR.
JOSEPH H. JACOBS
BY
Braddock and Braddock
ATTORNEYS United States Patent Office 2,723,388
Patented Nov. 8, 1955

2,723,388

PRESSURE RESPONSIVE WARNING SIGNAL

Joseph H. Jacobs, Osseo, Minn., assignor to Jacobs Wind Electric Company, Inc., Minneapolis, Minn., a corporation of Montana Application September 3, 1953, Serial No. 378,247

3 Claims. (Cl. 340—236)

The invention herein has relation to a warning signal responsive in its operation to changes in barometric pressure.

It is well known that tornadoes and other violent windstorms are preceded, accompanied and succeeded by quick changes of considerable magnitude in atmospheric pressure. Speaking generally, upon approach of a heavy windstorm, such as a tornado, toward an area, high barometric pressure is caused suddenly to exist at the area, and upon passing or dissipation of the windstorm, barometric pressure suddenly drops. During the windstorm, there may be frequent severe or violent changes in barometric pressure.

The present invention provides a device including a construction and arrangement, or mechanism, which will not be affected by normal or gradual changes in barometric pressure, but will be responsive to sudden and substantial changes in barometric pressure to cause an audible signal, or other discernible signal, to be produced. In the embodiment of the invention herein illustrated and described, an audible signal made discernible in response to sudden increase of considerable magnitude in atmospheric or barometric pressure is produced by a bell, and an audible signal made discernible in response to sudden decrease of considerable magnitude in atmospheric or barometric pressure is produced by a buzzer. Of course, production of audible signals by means other than bell and buzzer can be accomplished. Signalling means of any ordinary or preferred character can be employed in the device.

In the accompanying drawing forming a part of this specification,

Fig. 1 is a side elevational view of a pressure responsive warning signal made according to the invention, a protecting housing for the warning signal being partially broken away;

Fig. 2 is an enlarged sectional view, taken on line 2—2 in Fig. 1;

Fig. 3 is a detail sectional view, taken on line 3—3 in Fig. 1; and

Fig. 4 is a detail sectional view, taken as on line 4—4 in Fig. 2.

With respect to the drawing and the numerals of reference thereon, 10 denotes a cylindrical container, or drum providing a chamber 11 for atmosphere encompassed by said cylindrical container or drum. The cylindrical container or drum 10 is constituted as an end wall 12, circular as disclosed, of rigid material, a cylindrical wall 13 of rigid material perpendicular to said end wall 12 and integral with its circular margin, and a flexible diaphragm 14, in spaced relation to the end wall 12 and perpendicular to the cylindrical wall 13, having a circular margin thereof rigidly secured, as at 15, in airtight fashion to the end of said cylindrical wall 13 spaced from said end wall 12. An aperture 16 in the cylindrical wall 13 is for passage of air to and from the chamber 11, and a needle valve 17 is capable of manual adjustment to alter the size of the aperture 16 thus to control the possible rate of flow of air through said aperture into and out of said chamber. Save for the aperture 16, the chamber 11 is closed.

The flexible diaphragm 14 will not be appreciably affected by barometric or atmospheric pressure changes which are normal, gradual or of smaller magnitude. Instead, there will be passage of atmospheric air through the aperture 16, into or out of the chamber 11, as the case may be, in response to barometric or atmospheric pressure changes of inconsequential magnitude, with no appreciable deflection of the diaphragm 14. In response to rapid pressure changes of considerable magnitude, there will be appreciable flexing of said diaphragm 14, inwardly of the cylindrical container or drum 10 in response to increase of atmospheric pressure and outwardly of said cylindrical container or drum in response to decrease of atmospheric pressure. The aperture 16 will be adjusted to have size sufficiently great to permit passage of air through said aperture, to equalize pressure within and without the chamber 11, in response to ordinary and gradual changes in barometric pressure without appreciable flexing of the diaphragm 14, but yet sufficiently small to prevent passage of air through the aperture, to equalize pressure, in response to sudden and severe changes in barometric pressure at rate sufficiently rapid to preclude appreciable deflection, inwardly or outwardly, as the case may be, of said diaphragm. That is to say, in response to sudden and violent atmospheric pressure changes, the diaphragm 14 will be positively flexed or displaced, by reason of the fact that air will be precluded from passing through the aperture 16 into or out of the chamber 11 at rate sufficiently rapid to equalize pressure quickly enough to preclude positive flexing or displacement of said diaphragm. At the same time, said aperture will have sufficient size to permit passage of air into and out of said chamber in response to normal or gradual atmospheric pressure changes at rate sufficiently rapid to equalize pressure quickly enough to prevent flexing or displacement of the diaphragm.

An elongated base plate or bar 18 is insulatively supported upon the cylindrical wall 13, by spaced straps 19, 19 to lie in spaced, parallel, adjacent relation to and diametrically across the flexible diaphragm 14.

An elongated switch arm 20 includes a blade 21 at one of its ends, in perpendicular relation to said switch arm, having a knife edge 22 pivotally supported in a transverse slot 23 in the elongated base plate or bar 18 for swinging movement of the switch arm toward and away from the flexible diaphragm 14. Said switch arm is in spaced, substantially parallel relation to said elongated base plate or bar at the side thereof opposite said flexible diaphragm, and an end of the switch arm spaced from the blade 21 fixedly supports movable contact elements, denoted 24 and 25, respectively, at opposite sides of said switch arm, situated between and normally in spaced relation to fixed contact elements, indicated 26 and 27, respectively, supported upon the base plate or bar 18 in any suitable and convenient manner, as denoted generally at 28.

An actuator element, rod or bar 29, having a first end thereof rigid with a central portion of the flexible diaphragm 14, as represented at 30, passes freely through an opening 31 in the midlength of the elongated base plate or bar 18. A second end of said actuator element, rod or bar is engaged, as at 32, against an adjacent surface of the elongated switch arm 20 between the blade 21 and the movable contact elements 24, 25. As disclosed, the actuator element, rod or bar 29 is situated relatively close to said blade 21 and at comparatively greater distance from said movable contact elements 24, 25.

A leaf spring 33 has one of its ends rigidly secured, as at 34, against an adjacent surface of the elongated base plate or bar 18 and its opposite end engaged, as at 35, against a surface of the switch arm 20 opposite the actuator element, rod or bar 29, at a location between the blade 21 and said actuator element, rod or bar. A screw bolt 36 in the elongated base plate or bar 18 and the leaf spring 33 urges said leaf spring into resilient engagement with the elongated switch arm 20.

The construction and arrangement will be such that the flexible diaphragm 14 when in natural or unflexed condition will cause the actuator element, rod or bar 29 to firmly engage the elongated switch arm 20 to retain the movable contact elements 24 and 25, rigid with said elongated switch arm, in spaced relation to the fixed contact elements 26 and 27, respectively, against force exerted by the leaf spring 33 tending to cause the movable contact elements 24, 26 to become engaged. Stated otherwise, the flexible diaphragm 14 with actuator element, rod or bar 29 and the leaf spring 33 are operative upon opposed surfaces of the elongated switch arm 20 normally to situate said elongated switch arm so that the contact elements 24, 26 and 25, 27, respectively, are in separated relation, as disclosed in Fig. 2.

A lead wire 37 extends from the fixed contact element 26 to a bell 38, a lead wire 39 extends from said bell to a battery 40, and a lead wire 41 extends from the battery to the elongated base plate or bar 18.

A lead wire 42 extends from the fixed contact element 27 to a buzzer 43, and a lead wire 44 extends from said buzzer to the lead wire 39.

An insulating housing for the pressure responsive warning signal, to protect it from temperature changes, as, for example, when in the sun, is denoted 45.

Whenever barometric pressure outside of the cylindrical container or drum 10 increases suddenly and substantially, to extent causing the diaphragm 14 to be appreciably flexed inwardly, thus to withdraw the actuator element, rod or bar 29 from the elongated switch arm 20, the leaf spring 33 will react to flex said elongated switch arm inwardly and cause the movable contact element 24 to engage the fixed contact element 26 and close an energizing circuit for the bell 38, traced from 26 through 37, 38, 39, 40, 41, 18, 21 and 24 back to 26.

Whenever barometric pressure outside of the cylindrical housing or drum decreases suddenly and substantially, to extent causing or permitting the diaphragm 14 to be appreciably flexed outwardly, the actuator element, rod or bar 29 will act to flex the elongated switch arm outwardly, against resilient force of the leaf spring 33, and cause the movable contact element 25 to engage the fixed contact element 27 and close an energizing circuit for the buzzer 43, traced from 27 through 42, 43, 44, 39, 40, 41, 18, 21 and 25 back to 27.

In any instance of flexing of the diaphragm 14 to cause the contacts 24, 26 or 25, 27 to become engaged, the elongated switch arm 20 will be returned to its normal position to situate said contact elements 24, 26 and 25, 27 in separated relation upon equalization of pressure, by reason of passage of air through the aperture 16, inside and outside of the cylindrical container of drum 10.

Rapid and violent increase in barometric pressure of course will cause atmospheric air to pass through the aperture 16 into the chamber 11. Said aperture will be of size sufficiently small to prevent passage of air into said chamber rapidly enough to cause pressure within and without the chamber to be equalized quickly enough to prevent appreciable inward deflection of the diaphragm 14 in response to rapid and violent increase in barometric pressure.

Also, rapid and violent decrease in barometric pressure will cause atmospheric air to pass through the aperture 16 out of the chamber 11. Passage of air out of said chamber will be at rate too slow to cause pressure inside and outside the chamber to be equalized quickly enough to prevent appreciable outward deflection of the diaphragm 14 in response to rapid and violent decrease in barometric pressure.

Sensitivity of the new and improved pressure responsive warning signal will be a function of its various operative elements, as well as of the size of the aperture 16.

What is claimed is:

1. A pressure responsive warning signal comprising a container consisting of a hollow rigid member, constituted as a first end wall and a continuous side wall of said container, and a flexible diaphragm, constituting a second end wall of the container, upon said continuous side wall in spaced relation to said first end wall, encompasing a chamber for air under atmospheric pressure to which said flexible diaphragm is subjected to be capable of having appreciable deflection inwardly of the chamber in response to severe rise of atmospheric pressure exteriorly of said container, the chamber being closed save for an aperture through the container for passage of atmospheric air into and out of said chamber, the flexible diaphragm and aperture being cooperatively operative concurrently with and in response to deflection of said flexible diaphragm occurring by reason of gradual rise and fall of atmospheric pressure exteriorly of said container to equalize pressure within and without the chamber and render the flexible diaphragm incapable of being appreciably deflected, severe rise of atmospheric pressure exteriorly of the container being operative to accomplish appreciable deflection of said flexible diaphragm inwardly of said chamber and also accomplish equalization of pressure within and without the chamber by reason of the forcing of atmospheric air under pressure out of said chamber by way of the aperture, and a signal to be made discernible in response to appreciable inward deflection of said flexible diaphragm.

2. A pressure responsive warning signal comprising a container consisting of a hollow rigid member and a flexible diaphragm encompassing a chamber for air under atmospheric pressure to which said flexible diaphragm is subjected to be capable of having appreciable deflection inwardly of the chamber in response to severe rise of atmospheric pressure exteriorly of said container, the chamber being closed save for an aperture through the container for passage of atmospheric air into and out of said chamber, the flexible diaphragm and aperture being cooperatively operative concurrently with and in response to deflection of said flexible diaphragm occurring by reason of gradual rise and fall of atmospheric pressure exteriorly of said container to equalize pressure within and without the chamber and render the flexible diaphragm incapable of being appreciably deflected, severe rise of atmospheric pressure exteriorly of the container being operative to accomplish appreciable deflection of said flexible diaphragm inwardly of said chamber and also accomplish equalization of pressure within and without the chamber by reason of the forcing of atmospheric air under pressure out of said chamber by way of said aperture, a signal to be made discernible, an electric circuit for energizing said signal in response to appreciable deflection of said flexible diaphragm inwardly of the chamber, and means including said flexible diaphragm as part thereof normally retaining the electric circuit in open condition.

3. A pressure responsive warning signal comprising a container consisting of a hollow rigid member and a flexible diaphragm encompassing a chamber for air under atmospheric pressure to which said flexible diaphragm is subjected to be capable of having appreciable deflection inwardly of the chamber in response to severe rise of atmospheric pressure exteriorly of said container, the chamber being closed save for an aperture through the container for passage of atmospheric air into and out of said chamber, the flexible diaphragm and aperture being cooperatively operative concurrently with and in response to deflection of said flexible diaphragm occurring by reason of gradual rise and fall of atmospheric pressure exteriorly of said container to equalize pressure within and without the chamber and render the flexible diaphragm incapable of being appreciably deflected, severe rise of atmospheric pressure exteriorly of the container being operative to accomplish appreciable deflection of said flexible diaphragm inwardly of said chamber and also accomplish equalization of pressure within and without the chamber by reason of the forcing of atmospheric air under pressure out of said chamber by way of said aperture, a signal to be made discernible, an electric circuit for energizing said signal, an actuator element engaged with said flexible diaphragm normally retaining said electric circuit in open condition, and spring means for closing the electric circuit in response to appreciable deflection of the flexible diaphragm inwardly of said chamber.

References Cited in the file of this patent

UNITED STATES PATENTS

| | | |
|---|---|---|
| 1,986,479 | Lowe et al. | Jan. 1, 1935 |
| 2,100,184 | Cowan | Nov. 23, 1937 |
| 2,427,088 | Chapman et al. | Sept. 9, 1947 |
| 2,473,586 | Hosford | June 21, 1949 |
| 2,522,248 | Bair | Sept. 12, 1950 |